Dec. 18, 1962 M. H. PANNING ETAL 3,068,892
AUTOMATIC AIR FLOW REGULATING VALVE
Filed Aug. 31, 1960 2 Sheets-Sheet 1

INVENTORS
MARTIN H. PANNING
BRUCE R. CURRY
BY

ATTORNEYS

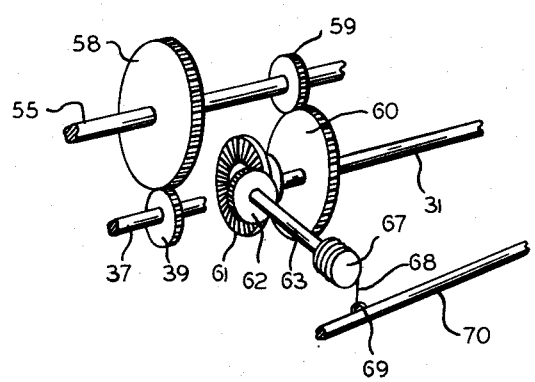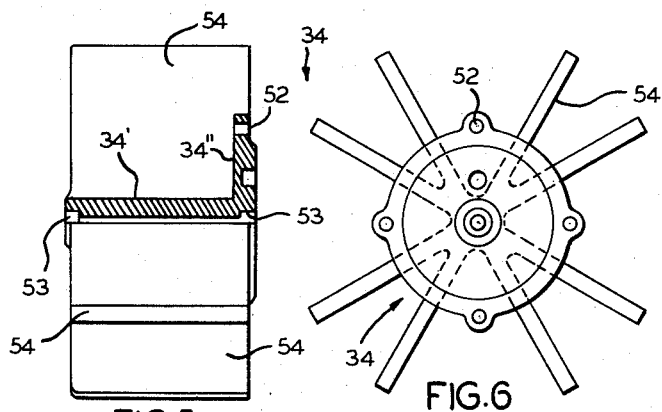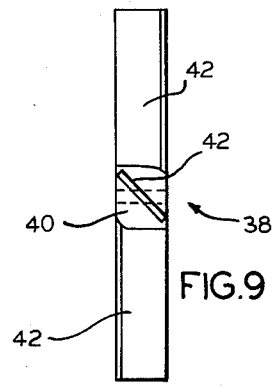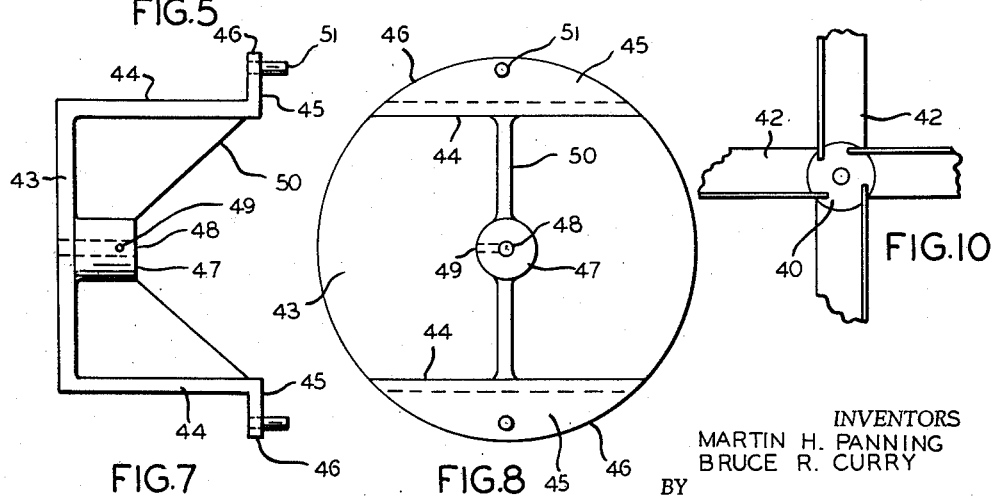

United States Patent Office 3,068,892
Patented Dec. 18, 1962

---

3,068,892
AUTOMATIC AIR FLOW REGULATING VALVE
Martin H. Panning and Bruce R. Curry, Thiensville, Wis., assignors to Blower Application Company
Filed Aug. 31, 1960, Ser. No. 53,162
10 Claims. (Cl. 137—499)

Our invention relates to fluid controls, and more particularly to an improved means of controlling the velocity of air passing through a duct, such as is shown and described in our co-pending application Serial No. 829,682.

It is oftentimes desirable to increase or decrease the resistance to flow through duct work. For example in situations where several cyclone separators are connected to a single exhaust fan, it is desirable to maintain the resistance to the exhaust streams from the separators substantially uniform so as to insure that the single fan is uniformly effective with each separator. In the case of such a system, a sudden drop in the resistance to the flow from one separator may result in the single fan pulling an unusually large flow from this separator with the result that the other separators do not function properly.

Similarly, in the case of air conditioning systems a single fan or blower may be used to deliver conditioned air through a large number of conditioning ducts for delivery to a large number of different rooms. If a window in one of these rooms is opened this results in a decrease in the resistance to flow in the duct feeding that particular room thereby increasing the flow to that particular room while at the same time adversely affecting the flow to the other rooms in the overall system.

The major purpose of the present invention is to provide a regulating device for regulating the air flow through the individual ducts in the system which device automatically adds resistance to flow through a duct if the resistance to flow for any reason drops below a predetermined amount. Similarly the system will decrease the resistance to the flow in the event the resistance to the outlet end of the duct increases particularly a desired amount. The system is particularly useful in connection with high velocity systems.

Another object of our invention is to provide a device that will automatically maintain a pre-set air flow in a duct regardless of fluctuations in the total pressure of a multi conduit system provided that the total pressure does not drop below the minimum necessary to induce such an air flow.

Another object of our invention is to provide a device of the character described that derives its actuating power entirely from the flow of air and requires no external power source other than a balance weight.

A still further object of our invention is to provide a device that will control the velocity of the air in each individual duct of a system using a single fan or blower connected to a plurality of duct outlets.

Other and further objects of our invention will become more apparent as the description proceeds, when taken with the claims and the drawings, in which:

FIGURE 4 is a fragmentary composite view of the salient parts constituting the controlling mechanism;

FIGURE 5 is a semi cross-sectional longitudinal view of the gear case cover equipped with the diffusing vanes;

FIGURE 6 is an end view of the gear case or cover, as shown in FIGURE 5;

FIGURE 7 is a side view of the rotating damper;

FIGURE 8 is an end view of the damper shown in FIGURE 7;

FIGURE 9 is a side view of the propeller, showing the vanes set angularly, and extending outward from a hub at 90° from one another; and FIGURE 10 is a front view of the propeller hub structure, showing the blades extending outward therefrom.

Figure 1:
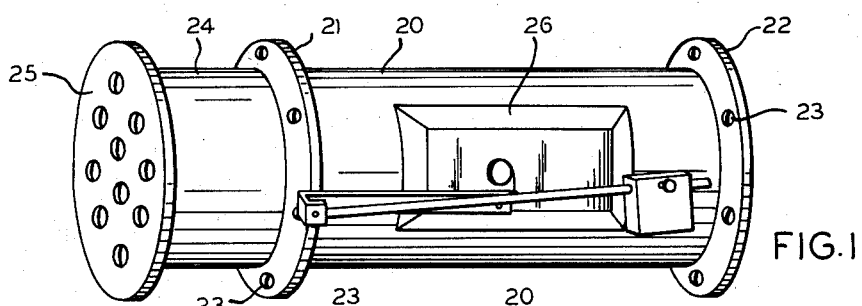
FIGURE 1 is a perspective view of the entire assembled device.
Figure 2:
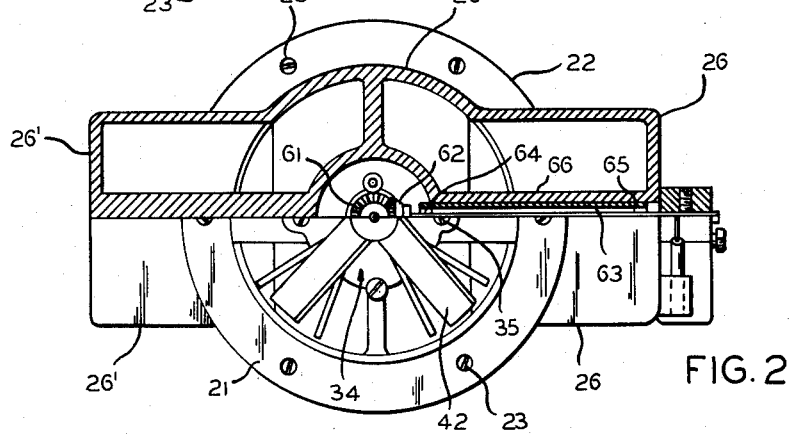
FIGURE 2 is a semi cross-sectional lateral view of the assembled device.
Figure 3:
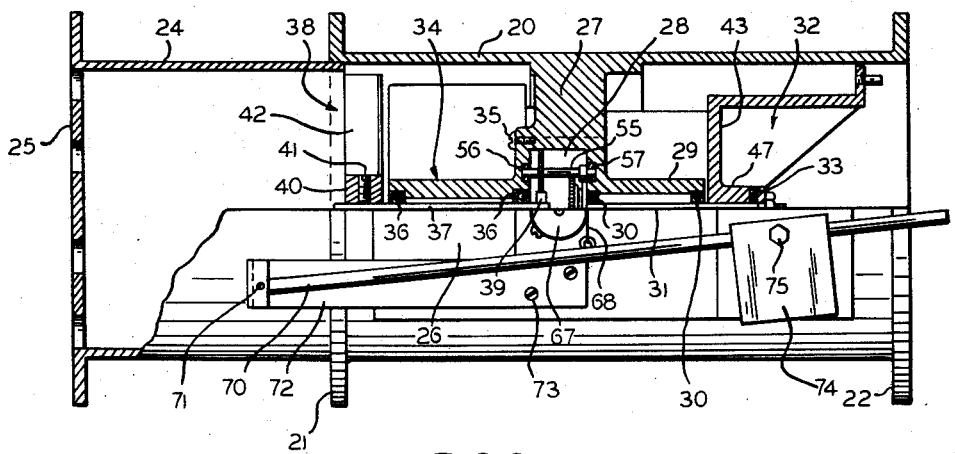
FIGURE 3 is a semi cross-sectional longitudinal view of the assembled device.

Similar characters of reference indicate corresponding parts throughout the several views, and referring now to the same, the character 20, shows a body, or casing, provided with outwardly projecting flanges 21 and 22, at the inlet and outlet ends of the body, respectively. The flanges 21 and 22, are shown provided with apertures 23, to accommodate bolts (not shown) to facilitate the mounting of the casing.

The inlet of the casing 20, is shown equipped with a cylindrical tubular adapter 24, having a perforated plate 25, extending across the inlet side thereof. The perforated plate 25 tends to establish a fairly uniform flow pattern for the air entering the casing. In some cases it may be omitted although in other cases, as for example, where the casing is next to an elbow, it is important to straighten the air flow.

The body 20 is also shown as having a pair of outwardly extending lateral enclosures 26 and 26', which communicate with the interior of the casing at their inner and outer ends, and shown integrally constructed with, and forming a part of, the body 20.

Centrally disposed within the body 20 is a gear case 27 provided with an enclosure 28. This gear case 27 extends rearwardly, terminating in a tubular member 29, equipped with bearings 30 therein for rotatably supporting an out-put shaft 31, on which a rotating damper member 32 is attached by means of a screw 33. The damper 32 is shown in detail in FIGURES 7 and 8. The gear case is centrally supported within the casing by radially extending members which are unitary with the casing 20, enclosure side walls, and the gear case.

The gear case 27 is provided with a cover member 34 shown in detail in FIGURES 5 and 6, and rigidly mounted thereto as shown by the screws 35. The tubular hub of cover 34 acts as a support for bearings 36 which rotatably support a drive shaft 37. Drive shaft 37 supports a propeller 38, which is shown in detail in FIGURES 9 and 10, at one end, and a pinion 39 on the other end, which end extends into the enclosure 28 within the gear case 27.

The propeller 38 includes a hub portion 40 attached to the drive shaft 37, by means of a set-screw 41. A plurality of angularly disposed vanes 42, extend outward from the hub 40. The vanes extend toward the inner surface of the cylindrical inner wall portion of the body 20. Vanes 42 are inclined so as to rotate in response to air flow.

The damper member 32 of FIGURES 7 and 8, consists of a disc like flange 43 having integrally constructed damper plate portions 44 extending outward therefrom and spaced apart from one another. The portions 44 are in parallel relation to one another and parallel to the axis of the hub 47. The forward portions of the damper plates have outwardly extending members 45, with accurately formed outer edges 46, to extend toward the inner wall surface of the outlet of the body, or casing 20.

A hub portion 47 is integral with, and extends rearwardly from the flange 43. This hub has a tubular bore 48 for mounting on the out-put shaft 31, and has a threaded aperture 49 to receive the set screw 33. Web members 50 extend from the hub 47 to the outer ends of the plates 44 for their support, and pins 51 are inserted into the face of the members 45, and project outward therefrom, for contact with pins (not shown) extending inwardly from the inner face of the outlet of the casing 20, to limit the angular movement of the damper assembly 32.

In FIGURES 5 and 6, we show a detail construction of the gear case front cover 34, consisting of a tubular bearing 34' and a flange 34" extending outward therefrom at the rear thereof. The flange 34" has a plurality of openings 52 to accommodate screws 35 for attachment to the gear case 27. The tubular bearing 34' has recesses 53 to accommodate bearings 36. A plurality of angularly spaced diffusers or blades 54 extend radially outwardly from the tubular bearing 34' for guiding the air passing through the inlet of the body 20.

In FIGURE 4, we show an assembly of the actuating members disposed within the enclosure 28 of the gear case 27. The auxiliary shaft 55 mounted in bearings 56 and 57, supports a spur gear 58, which engages the pinion 39 on the drive shaft 37, and a pinion 59, mounted on the shaft 55 engages a spur gear 60, mounted on the output shaft 31.

The inwardly disposed end of the shaft 31, has a bevel gear 61, engaging another bevel gear 62 mounted on the balance shaft 63, supported by bearings 64 and 65 within the tubular enclosure 66, forming a part of the body, or casing 20, within the enclosure 26 thereof.

The balance shaft 63 is equipped with a cylindrical drum 67, acting as a reel for a cord 68, attached to, and encircling its outer periphery. The open end of the cord 68 is attached to an eyelet 69 on a balance rod 70, pivotally attached at 71 to a support arm 72, attached at 73 to the outside surface of the enclosure 26 forming a part of the body 20. The extending end portion of the balance rod 70, is supplied with a balance weight 74, slidably supported thereon, and retained in a predetermined fixed position on the rod 70, by means of the screw 75.

In use, the main casing 20 and adapter 24 may be inserted in any gaseous conduit system.

When inserted, the air or gasses enter through the adapter 24 and are dispersed more or less uniformly by the apertured plate 25. This is especially important in the case of installation of the present system immediately following an elbow in duct work. This substantially uniform flow of air passes the propeller blades 42 and the diffuser 34. The diffuser 34 counteracts the spinning tendency of the air stream, which spinning tendency is imparted to the air stream by the propeller blades. The spinning tendency of the air stream should be reduced to a minimum to avoid adversely effecting the dampers 44. A spinning flow of air will impart a turning movement to the dampers and thus tend to upset the balance of the system.

The stream, as it passes through the casing, will be diverted outwardly and into the side enclosures from whence it passes into the rearward portion of the main casing 20 and passes the damper plates 44.

The amount of resistance to the air stream is governed by the position of the damper plates 44. When the damper blades are substantially vertical they substantially close up all communication between the side enclosures and the rearward portion of the main casing 20, flow along the main axis casing 20 being obstructed by the disc 43 of the damper member.

In order to properly regulate the air flow, the weight 74 is set to a position on rod 70 where it balances the torque produced by the air stream on the propeller blades 42 and at the same time maintains the dampers 44 in a position such that sufficient exhaust area is allowed for the air stream as to insure the desired flow velocity. If for any reason the air stream entering the system falls below this velocity then the biasing action of the weight 74 will tend to rotate the dampers toward a more fully opened position. If the velocity entering the system exceeds the desired velocity then this increase in velocity will impart a greater turning movement to the fan blades thus causing the dampers to move towards closed position, thereby restricting flow.

The system is so designed as to control essentially clean air although the system will allow small quantities of dust to be conveyed within the air stream.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. In an air control system for maintaining resistance to flow in a duct substantially constant, the improvement including an air flow duct, said air flow duct having a central portion and laterally extended side portions with the interior of said side portions communicating with the central portion of said duct, said side portions and central portion being elongated, a fan mounted for rotation about an axis aligned with the axis of said central portion at the forward end of said central portion, a series of stationary diffuser blades mounted rearwardly of said fan for counteracting turbulence in said flow, means blocking flow through the central portion of said duct at a position rearwardly of said diffuser blades, damper means for restricting communication between said side portions and said central portion at a position rearwardly of said blocking means, and means moving said damper means towards relatively open and relatively closed positions with respect to said side portions in response to rotation of said fan.

2. A control assembly for gaseous flow including an elongated duct body, a fan mounted for rotation in the interior of said body in the entrance end of said body, means obstructing flow in the central portion of said body and means bypassing said obstructing means to allow communication between the forward portion of said body and the rearward portion of said body, movable damper means for regulating the flow through said by-pass means, said fan being mounted on a shaft for rotation therewith, gear means connected between said shaft and said damper means for causing movement of said damper means in consonance with the rotation of said fan, and adjustable means resisting the rotation of said fan.

3. The structure of claim 2 wherein said resisting means includes a movable weight inter-connected with said gear means so as to resist the rotation of said fan in a direction such as to close said damper means.

4. The structure of claim 2 wherein said gear means are mounted in a transmission housing positioned centrally of said duct body.

5. The structure of claim 2 wherein said obstructing means includes a baffle mounted in the central portion of said duct body.

6. A control assembly for gaseous flow ducts including an elongated duct body, a fan mounted for rotation in the interior of said body in a forward portion thereof, means obstructing flow in the central portion of said body and means by-passing said obstructing means to allow communication between the forward portion and rearward portion of said body, movable damper means for regulating the flow between said by-pass means and said rearward portion of said body, said damper means being interconnected with said fan and being movable in response to rotation of said fan, said damper means being movable in a flow restricting direction in response to rotation to said fan induced by the air flow through the forward portion of said duct, adjustable means resisting rotation of said fan, and diffusing means between said fan and said by-pass means, said diffusing means being adapted to counteract turbulence in the air stream passing said fan and thereby provide uniformity of flow in the stream passing to said by-pass means.

7. The structure of claim 6 wherein said diffusing means includes a series of stationary blades extending radially with respect to the axis of said duct body and angularly spaced from one another.

8. The structure of claim 6 characterized by and including an apertured plate positioned forwardly of said fan for promoting uniformity of flow in the stream passing to said fan.

9. A flow regulating assembly for air ducts and the like including an elongated air duct, said duct having means obstructing passage through the center of said duct and by-pass passages positioned laterally of said obstructing means, said by-pass passages communicating with the interior of the duct on opposite sides of said duct and at opposite ends of said obstructing means, a rotary baffle journalled for rotation in said duct at one end of said obstructing means and adjacent the point of communication between said by-pass passages and the interior of said duct, said baffle including spaced surfaces positioned on opposite sides of the rotary axis thereof and equidistant therefrom, said baffle surfaces being adapted to open, restrict, and close the passage between said by-pass passages and said duct during rotation of said baffle, and means for rotating said baffle towards open and closed positions in response to changes in the velocity of air flowing through said duct.

10. A control assembly for gaseous flow including an elongated duct body, a fan mounted for rotation in the interior of said body in the entrance end of said body, means obstructing flow in the central portion of said body and means bypassing said obstructing means to allow communication between the forward portion of said body and the rearward portion of said body, movable damper means for regulating the flow through said bypass means, said fan being mounted on a shaft for rotation therewith, means connecting between said shaft and said damper means for causing movement of said damper means in consonance with the rotation of said fan, and adjustable means resisting the rotation of said fan.

References Cited in the file of this patent

UNITED STATES PATENTS

| | | |
|---|---|---|
| 1,305,403 | Perrine | June 3, 1919 |
| 1,343,162 | Sherwen | June 8, 1920 |
| 2,021,408 | Feinberg | Nov. 19, 1935 |
| 2,670,756 | Granberg | Mar. 2, 1954 |